United States Patent
Kester et al.

(10) Patent No.: US 11,448,797 B1
(45) Date of Patent: Sep. 20, 2022

(54) VIEWING LENS AND METHOD FOR TREATING LENSES TO MINIMIZE GLARE AND REFLECTIONS FOR BIRDS WITH TETRA-CHROMATIC VISION

(71) Applicant: Quantum Innovations, Inc., Central Point, OR (US)

(72) Inventors: Norman L. Kester, Rogue River, OR (US); Adam E. Winkelman, Foley, MN (US); Nicholas M. Hall, Ashland, OR (US); Richard D. Unbankes, Medford, OR (US)

(73) Assignee: QUANTUM INNOVATIONS, INC., Central Point, OR (US)

( * ) Notice: Subject to any disclaimer, the term of this patent is extended or adjusted under 35 U.S.C. 154(b) by 126 days.

(21) Appl. No.: 16/688,449

(22) Filed: Nov. 19, 2019

Related U.S. Application Data (60) Provisional application No. 62/772,755, filed on Nov. 29, 2018.

(51) Int. Cl.
| | |
|---|---|
| *G02B 1/115* | (2015.01) |
| *G02B 1/18* | (2015.01) |
| *G02B 5/00* | (2006.01) |
| *B05D 7/00* | (2006.01) |
| *B05D 3/14* | (2006.01) |

(Continued)

(52) U.S. Cl.
CPC .............. *G02B 1/115* (2013.01); *B05D 3/002* (2013.01); *B05D 3/142* (2013.01); *B05D 5/061* (2013.01); *B05D 7/5783* (2013.01); *G02B 1/18* (2015.01); *G02B 5/003* (2013.01)

(58) Field of Classification Search
CPC .......... G02B 1/115; G02B 1/18; G02B 5/003; B05D 3/142; B05D 3/002; B05D 5/061; B05D 7/5783
See application file for complete search history.

(56) References Cited

U.S. PATENT DOCUMENTS

| | | |
|---|---|---|
| 2,391,595 A | 12/1945 | Richards et al. |
| 4,632,527 A * | 12/1986 | Masso ...................... G02B 1/10 427/164 |
| 5,409,760 A | 4/1995 | Neitz et al. |

(Continued)

FOREIGN PATENT DOCUMENTS

WO    WO2015009349    1/2015

*Primary Examiner* — Balram T Parbadia
(74) *Attorney, Agent, or Firm* — Jerry Haynes Law (57) ABSTRACT

A viewing lens and method for treating lenses to minimize glare and reflections for birds with tetra-chromatic vision. The anti-reflection lens is treated to with a coating on the surface. The coating is configured to enable the lens surface to be less perceptible to a bird with tetra-chromatic vision by reducing reflections therefrom. The lens treatment includes applying an anti-reflective coating in multiple coats. The coats comprise an adhesion composition, a low index composition (such as $SiO_2$), a high index composition (such as $ZrO_2$), and a superhydrophobic composition that are applied in subsequent layers of varying nanometer thicknesses. The treated lens exhibits minimal reflection properties in the visible range of the electromagnetic spectrum and almost no reflection in the UV-A range. This creates a lens surface that is difficult for birds with tetra-chromatic vision to see a reflection therefrom.

19 Claims, 5 Drawing Sheets

(51) Int. Cl.
*B05D 5/06* (2006.01)
*B05D 3/00* (2006.01)

(56) References Cited

U.S. PATENT DOCUMENTS

| | | | |
|---|---|---|---|
| 5,541,735 A | 7/1996 | Rengle | |
| 6,906,862 B2 | 6/2005 | Cross | |
| 7,873,213 B2 | 1/2011 | Speigle et al. | |
| 8,358,467 B2 | 1/2013 | Fan et al. | |
| 8,557,877 B2 | 10/2013 | Mukhupadhyay et al. | |
| 2002/0024705 A1* | 2/2002 | Nakano | G02C 7/10 398/159 |
| 2002/0039236 A1* | 4/2002 | Jones | H01J 29/896 359/601 |
| 2003/0094714 A1* | 5/2003 | Buazza | G02B 1/041 264/1.32 |
| 2005/0143812 A1 | 6/2005 | Paul et al. | |
| 2010/0033810 A1* | 2/2010 | Haida | B32B 27/306 359/361 |
| 2011/0019282 A1* | 1/2011 | Lusinchi | H04N 5/2254 359/619 |
| 2012/0019915 A1* | 1/2012 | Yan | B32B 33/00 359/586 |
| 2014/0374377 A1* | 12/2014 | Schulz | B29D 11/00865 216/24 |
| 2015/0083193 A1 | 2/2015 | Ueda | |
| 2015/0131047 A1* | 5/2015 | Saylor | G02C 7/12 351/44 |
| 2016/0003982 A1* | 1/2016 | Avetisian | G02B 1/115 359/360 |
| 2016/0137850 A1* | 5/2016 | Ridealgh | C08K 3/22 428/195.1 |
| 2018/0173071 A1* | 6/2018 | Mathew | B32B 17/06 |

* cited by examiner

VIEWING LENS AND METHOD FOR TREATING LENSES TO MINIMIZE GLARE AND REFLECTIONS FOR BIRDS WITH TETRA-CHROMATIC VISION

CROSS-REFERENCE TO RELATED APPLICATIONS

This application claims the benefits of U.S. provisional application No. 62/772,755, filed Nov. 29, 2018 and entitled VIEWING LENS AND METHOD FOR TREATING A LENS TO REDUCE LIGHT WAVELENGTHS TO MAKE THE VIEWING LENS LESS PERCEPTIBLE TO BIRDS WITH TETRA-CHROMATIC VISION, which provisional application is incorporated by reference herein in its entirety.

FIELD OF THE INVENTION

The present invention relates generally to a viewing lens and method for treating lenses to minimize glare and reflections for birds with tetra-chromatic vision. More so, the present invention relates to a viewing lens that is treated with an anti-reflective coating on the surface to be perceptible to birds with tetra-chromatic vision; whereby the lens treatment includes applying an anti-reflective coating in multiple coats comprising an adhesion composition, a low index composition, a high index composition, and a superhydrophobic composition that are coated in subsequent layers of varying nanometer thicknesses onto either or both the faces of the substrate; and whereby the treated substrate exhibits minimal reflection properties in the visible range of the electromagnetic spectrum and almost no reflection in the UV-A range, so as to make it difficult for birds with tetra-chromatic vision to see a glare or reflection when looking towards the viewing lens.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Those skilled in the art will recognize that humans see a wide range of color as a result of three types of cones in our eyes: one that's sensitive to short-wavelength light in the blue portion of the color spectrum, one sensitive to middle-wavelength light in the green portion and a third type receptive to long-wavelength light in the red portion.

In contrast to humans' "trichromatic" vision, birds, ducks, amphibians, and other tetra-chromatic organisms have "tetra-chromatic" vision. This is because birds have much different eyes and vision systems than humans. They see color more intensely and vibrantly as well as having the ability to see into the UV range. The human eye does not perceive the UV wavelengths of light.

Those skilled in the art will recognize that tetrachromacy is the condition of possessing four independent channels for conveying color information, or possessing four types of cone cells in the eye. Organisms with tetrachromacy vision are called tetrachromats. In tetrachromatic organisms, the sensory color space is four-dimensional, meaning that to match the sensory effect of arbitrarily chosen spectra of light within their visible spectrum requires mixtures of at least four primary colors.

It is also known that the human eye does not perceive the UV wavelengths of light. Current viewing lenses and viewing surfaces reflect varying amounts of light. When viewing lenses and viewing surfaces are treated in order to create visual effects or increased light transmission or sensitivity, this is generally in a spectral range and does not account for all of the wavelengths of light that tetrachromacy allows.

Other proposals have involved viewing lenses that help reduce reflections for birds with tetra-chromatic vision. The problem with these viewing lenses is that they are not treated with a unique anti-reflective coating. Also, the viewing lenses are not adaptable to fit into viewing devices, such as rifle sites and binoculars. Even though the above cited anti-reflection lenses meet some of the needs of the market, a viewing lens and method for treating lenses to minimize glare and reflections for birds with tetra-chromatic vision that is treated with a coating on the surface to be perceptible to a bird with tetra-chromacy vision; whereby the lens treatment includes applying an anti-reflective coating in multiple coats comprising an adhesion composition, a low index composition (such as $SiO_2$), a high index composition (such as $ZrO_2$), and a superhydrophobic composition in subsequent layers of varying nanometer thicknesses; and whereby the treated lens exhibits minimal reflection properties in the visible range of the electromagnetic spectrum and almost no reflection in the UV-A range, so as to make it difficult for birds with tetra-chromatic vision to see glares and reflections when looking towards the viewing lens, is still desired.

SUMMARY

Illustrative embodiments of the disclosure are generally directed to a viewing lens and method for treating lenses to minimize glare and reflections for birds with tetra-chromatic vision. The viewing lens is treated to with an anti-reflective coating on one or both surfaces. The anti-reflective coating is configured to enable the viewing lens surface to be less perceptible to a bird with tetra-chromatic vision by reducing glare and reflections off the lens surface.

In some embodiments, the viewing lens comprises a transparent, or partially transparent substrate that is defined by a first face and a second face. The faces are defined by UV absorbing properties. The first face of the substrate comprises an anti-reflective coating. In one possible embodiment, the anti-reflective coating helps minimize reflection of light in the visible range of light between 400 to 700 nanometers and the ultra violet range of light between 300 to 400 nanometers. In another possible embodiment, the second face of the substrate comprises the anti-reflective coating. Similar to the first face, the anti-reflective coating on the second face helps minimize reflection of light in the visible range of light between 400 to 700 nanometers and the ultraviolet range of light between 300 to 400 nanometers.

In some embodiments, the lens treatment includes applying the anti-reflective coating in multiple coats. The coats comprise an adhesion composition, a low index composition (such as $SiO_2$), a high index composition (such as $ZrO_2$), and a superhydrophobic composition that are applied in subsequent layers of varying nanometer thicknesses. The treated lens exhibits minimal reflection properties in the visible range of the electromagnetic spectrum and almost no reflection in the UV-A range. This creates a lens surface that is difficult for birds with tetra-chromatic vision to see a reflection therefrom.

In another aspect, a method for treating an optical lens to reduce the light wavelengths to make the optical lens less perceptible to birds with tetra-chromatic vision, comprises providing a lens, the lens comprising a first face and a second face, the surfaces being defined by UV absorbing properties; removing debris from the surfaces of the lens; etching the surfaces of the lens with an ultrasonic etching device.

It is also significant to note that, if the lens is not hard-coated, dipping the lens into a primer solution; if the lens is not hard-coated, spinning the primer solution onto the lens; if the lens is not hard-coated, curing the lens in an oven. Nonetheless, the method further comprises a Step of plasma etching the surfaces of the lens to prepare the surfaces for adhesion of an anti-reflective coating.

In other embodiments, the method may include applying an anti-reflective coating in multiple coats comprising an adhesion composition, a low index composition, a high index composition, and a superhydrophobic composition, the multiple coats being coated on the surfaces of the lens as follows: applying an adhesion composition; applying 164.53 nm of a low index composition on the surfaces of the lens; applying 14.16 nm of a high index composition on the surfaces of the lens; applying 23.5 nm of the low index composition on the surfaces of the lens; applying 101 nm of the high index composition on the surfaces of the lens; applying 76.19 nm of the low index composition on the surfaces of the lens; and applying a superhydrophobic composition on the surfaces of the lens.

It may also be necessary to flip the substrate on both sides to apply the anti-reflective coating, flipping the substrate and coating opposing faces in the same manner. A final Step may also include integrating the lens into a viewing device, such as a rifle site or a binocular.

In another aspect, the viewing lens is a circular transparent substrate that is adaptable to fit in a rifle site or binoculars.

In another aspect, the viewing lens can include any of the following: Trivex® lens, a polycarbonate lens, High Index, a UV treated Cr-39 lens, or a glass lens.

In another aspect, the viewing lens has the ability to filter UV as an inherent function of the lens substrate or by being UV treated.

In another aspect, the vacuum coating is applied through an electron beam gun evaporation technique or a magnetron sputtering technique.

In another aspect, the low index composition comprises such as $SiO_2$ or $ZrO_2$ materials.

One objective of the present invention is to provide a viewing lens that reduces glares and reflections.

Another objective is to help prevent birds, such as ducks, geese, and pheasant from seeing reflections from the lens of a scope on a hunting rifle, binoculars and range finders, by treating the lens with an anti-reflective coating.

Another objective is to reduce the wavelengths of light reflected, such that a bird cannot see the reflections from the lens.

Yet another objective is to produce an optical lens or viewing surface that has the appearance of little to no reflection in the visible range of the electromagnetic spectrum.

Yet another objective is to enhance hunting for birds by reducing the odds that the bird will see the hunter, and the lens of the hunting rifle or binoculars.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

FIGS. 1-8 reference an exemplary viewing lens 100 and method 800 for treating lenses to minimize glare and reflections for birds with tetra-chromatic vision. The viewing lens is uniquely configured to reduce glare and reflections from the point of view of a bird, such as a duck, goose, pheasant, etc., having tetra-chromatic vision. Specifically, the viewing lens is treated, so as to reduce light wavelengths that strike a substrate 102 that is fitted inside a viewing device 116. By reducing the light wavelengths, glare is reduced; thereby producing a lens substrate 102 that is less perceptible to a bird 118 with tetra-chromatic vision that is being hunted, or viewed for recreation.

Figure 1:
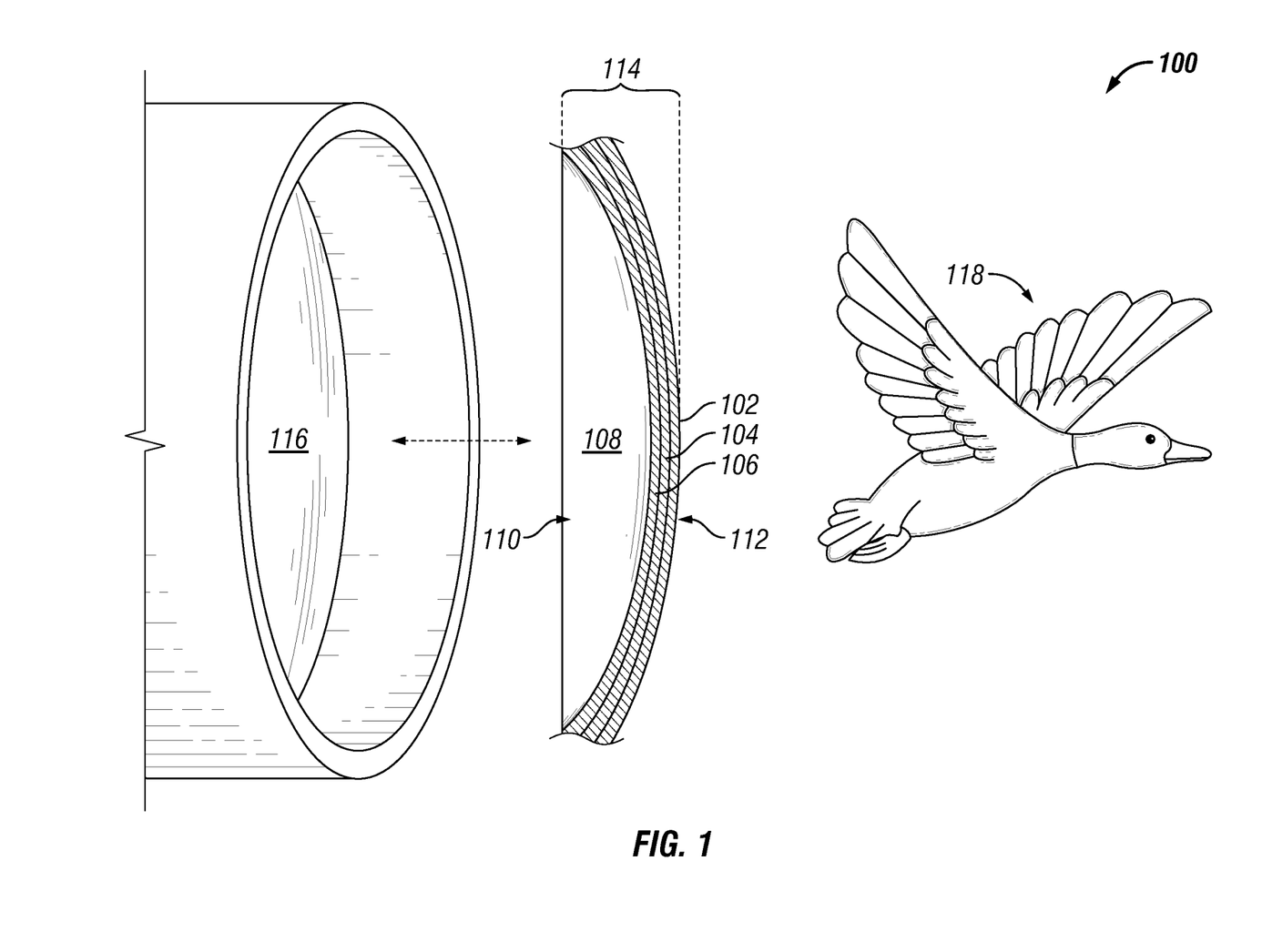
FIG. 1 shows a perspective side view of an anti-reflection lens, showing a substrate layered with compositions from an anti-reflective coating, in accordance with an embodiment of the present invention.

For treating the substrate 102, an anti-reflective coating 114 is sequentially layered on opposing faces 110, 112 of the substrate. It is the unique composition of the anti-reflective coating 114 that makes the faces 110, 112 of the substrates 102 less apparent or undetectable to the bird 118. Specifically, reflections that appear on the substrate 102 at specific wavelengths of light are annulled through use of a unique anti-reflective coating 114 consisting of multiple compositions applied sequentially onto the faces of the substrate 102. In operation, the treated substrate is fitted in a viewing device 116, such as a rifle site or binoculars, for operational use thereof.

FIG. 1 shows a perspective side view of an exemplary substrate 102 utilized with the anti-reflection lens 100. In some embodiments, the substrate 102 is selected for treatment. Initially before treatment, the substrate 102 must absorb 97%+ UV in all ranges. Further, the selected substrate 102 must be hand cleaned to remove all debris and contaminants that may create defects in the final optical lens product. The substrate 102 has a first face comprising an anti-reflective coating 114 that is configured to be coated onto the faces in multiple stages, through vacuum process.

Figure 2:
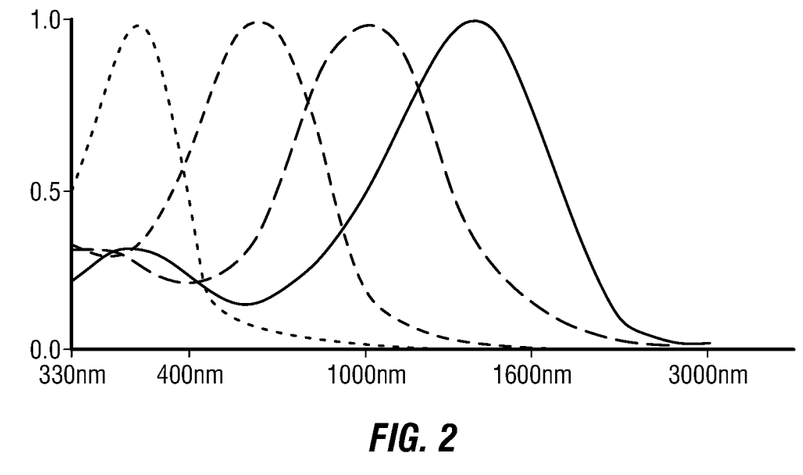
FIG. 2 shows a graph depicting the UV absorbance ranges for current lenses that reflect light, in accordance with an embodiment of the present invention.

An exemplary UV absorbance graph 200 is referenced in FIG. 2. The graph 200 illustrates how the substrate 102 can reflect varying amounts of light across the UV range. This is prior to coating with the anti-reflective coating. It is evident that when the substrate 102 is treated, in order to create visual effects or increased light transmission or sensitivity, the spectral range does not account for all of the wavelengths of light that tetrachromacy allows. Thus, the anti-reflective coating treats specifically for tetra-chromatic vision, such as found in birds. The present invention details optical lens and viewing surface treatments that allow for reductions in all wavelengths of light in order to make it difficult for birds with tetrachromacy to discover these devices via reflection that are perceptible to the bird.

Looking again at FIG. 1, the substrate 102 is coated with multiple, sequential layers of compositions from an anti-reflective coating 114. As illustrated, the lens 100 comprises a substrate 102 having a first face 110 and a second face 112. The faces 110, 112 are defined by UV absorbing properties. The first face 110 of the substrate 102 comprises an anti-reflective coating 114. In one possible embodiment, the anti-reflective coating 114 helps minimize reflection of light in the visible range of light between 400 to 700 nanometers and the ultra violet range of light between 300 to 400 nanometers. In another possible embodiment, the second face 112 of the substrate 102 comprises the anti-reflective coating 114. Similar to the first face 110, the anti-reflective coating 114 on the second face 112 helps minimize reflection of light in the visible range of light between 400 to 700 nanometers and the ultraviolet range of light between 300 to 400 nanometers.

The substrate 102 is treated by applying an anti-reflective coating 114 in multiple coats to at least one of the faces. In alternative embodiments, the peripheral edge of the substrate may also be coated. The treatment applied to the substrate 102 is designed to minimize reflection of light in the visible range of light between 400-700 nanometers, or the UV range between 300-400 nanometers. The faces of the substrate 102 have UV absorbing properties. This inherent quality of substrate works in conjunction with anti-reflective coating 114 to create the unique anti-reflection properties.

In some embodiments, the layers of coating may include an adhesion composition 102, a low index composition 104 (such as $SiO_2$), a high index composition 106 (such as $ZrO_2$), and a superhydrophobic composition 108 that are applied in subsequent layers of varying nanometer thicknesses. After treatment, the substrate 102 has the appearance of little to no reflection in the visible range of the electromagnetic spectrum, and little to no reflection in the UV-A range. This creates an imperceptible lens to the bird; thereby making it difficult for the bird to discover the lens.

In some embodiments, if the substrate 102 is not hard-coated, the substrate 102 is carried through a hard-coating process, as described below. If the substrate 102 is hard-coated, the hard-coating steps described below are not utilized however. Further, if the substrate 102 is hard-coated, but the manufacturer wishes to apply a better hard-coat to the substrate 102, the substrate 102 is passed through a strip and dip process.

Similar to the first face 110 of the substrate 102, the second face 112 of the substrate 102 includes an anti-reflective coating 114 that is configured to minimize reflection of light in the visible range of light between 400-700 nanometers, or the UV range between 300-400 nanometers. In this manner, the internal absorption of the substrate 102 absorbs 97%+ of the UV in all ranges. Thus, the substrate 102 creates little to no reflection in the visible range of the electromagnetic spectrum and little to no reflection in the UV-A range. This lack of reflective properties from the point of view of a bird with tetra-chromatic eyesight is also at normal angles of incidence as well as off axis angles of incidence up to 60°.

Figure 3:
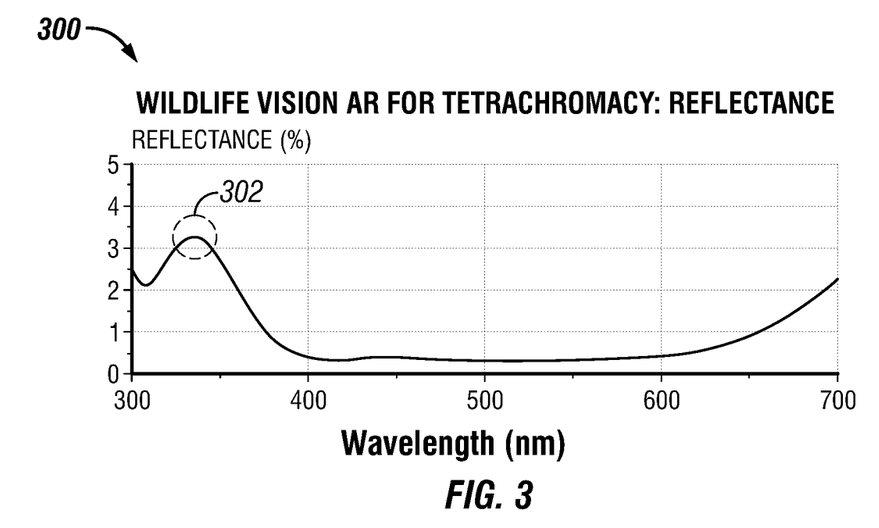
FIG. 3 shows a reflectance graph of an anti-reflective coating that reflects 2.1% in 700 nm range and 3.2% in the 350 nm range at a 0° angle of incidence, in accordance with an embodiment of the present invention.

In some embodiments, the thickness and uniformity of the anti-reflective composition applied to the substrate 102 can be adjusted to vary the reflectiveness. As a reflectance graph 300 in FIG. 3 shows, the first and second face of the substrate includes an anti-reflective coating that is designed to reflect very little in the visible range of light between 400-700 nm's, or the UV range between 300-400 nm's. In this example, the same anti-reflective coating reflects 2.1% in 700 nm range and 3.2% in the 350 nm range and 0° of incidence. Thus, an optimal reflectance percentage 302 of 2.1% in 700 nanometer range and 3.2% in the 350 nanometer range and 0° angle of incidence. This is effective for substantially eliminating glare for the lens.

Figure 4:
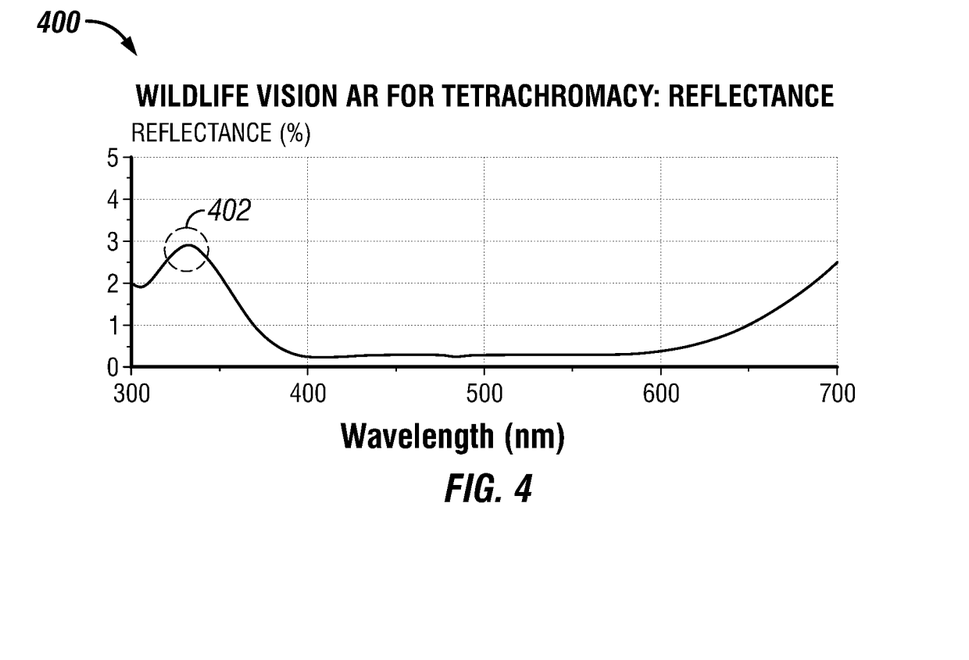
FIG. 4 shows a reflectance graph of an anti-reflective coating that reflects 2% in the 700 nm range and 2.9% in the 340 nm range at a 15° angle of incidence, in accordance with an embodiment of the present invention.

In another exemplary reflectance graph 400, shown in FIG. 4, the same anti-reflective coating reflects 2% in the 700 nm range and 2.9% in the 340 nm range at 15° angle of incidence. This exhibits a reflectance percentage 402 of 2% in the 700 nanometer range and 2.9% in the 340 nanometer range at 15° angle of incidence. This configuration is also efficacious for reducing glare/reflections from the faces 110, 112 of the substrate 102; and thereby substantially eliminating glare for the substrate 102.

Figure 5:
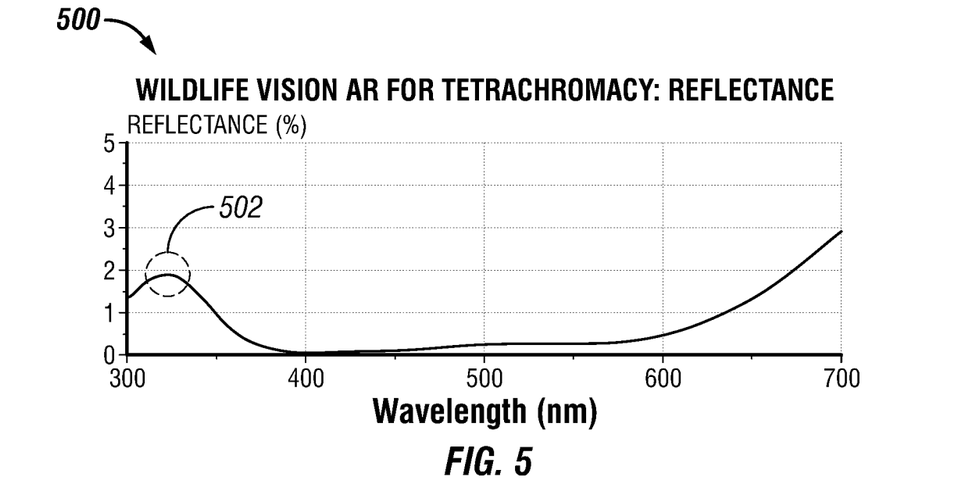
FIG. 5, a reflectance graph of an anti-reflective coating that reflects 2.8% in the 700 nm range and 1.9% in the 325 nm range at a 30° angle of incidence, in accordance with an embodiment of the present invention.
Figure 6:
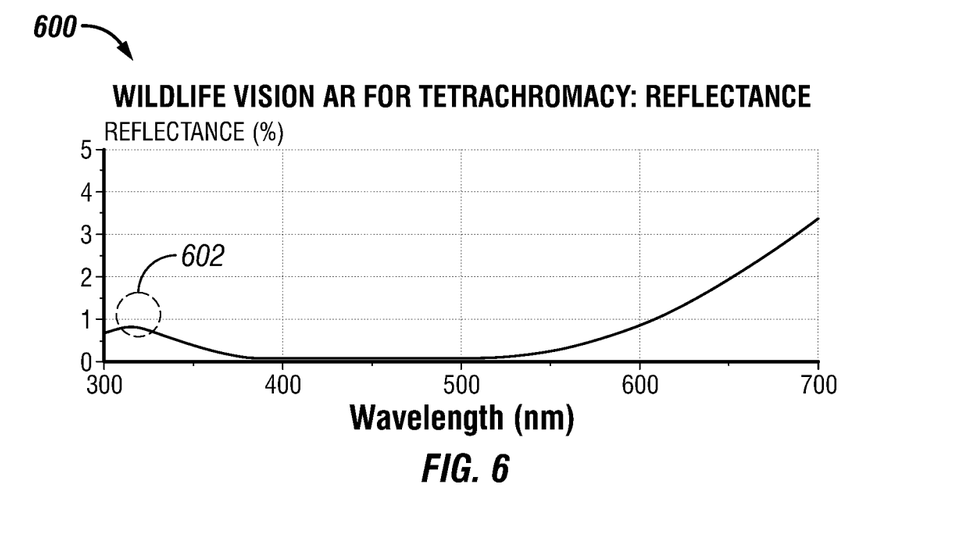
FIG. 6, a reflectance graph of an anti-reflective coating that reflects 3.2% at 700 nm's and 1.8% at 310 nm range at a 45° angle of incidence, in accordance with an embodiment of the present invention.

Looking at a reflectance graph 500 in FIG. 5, the same anti-reflective coating reflects 2.8% in the 700 nm range and 1.9% in the 325 nm range at 30° angle of incidence. This exhibits a reflectance percentage 502 of 2.8% in the 700 nanometers range and 1.9% in the 325 nanometer range at 30° angle of incidence. Another reflectance graph 600 shows the reflectance when the angle of incidence is at 45°. This 45° is used in the same anti-reflective coating reflecting 3.2% at 700 nm and 1.8% at 310 nm range at the 45° angle of incidence. As shown in FIG. 6, another embodiment of the anti-reflective coating exhibits a reflectance percentage 602 of 3.2% at 700 nanometers and 1.8% at 310 nanometer range at 45° angle of incidence.

Figure 7:
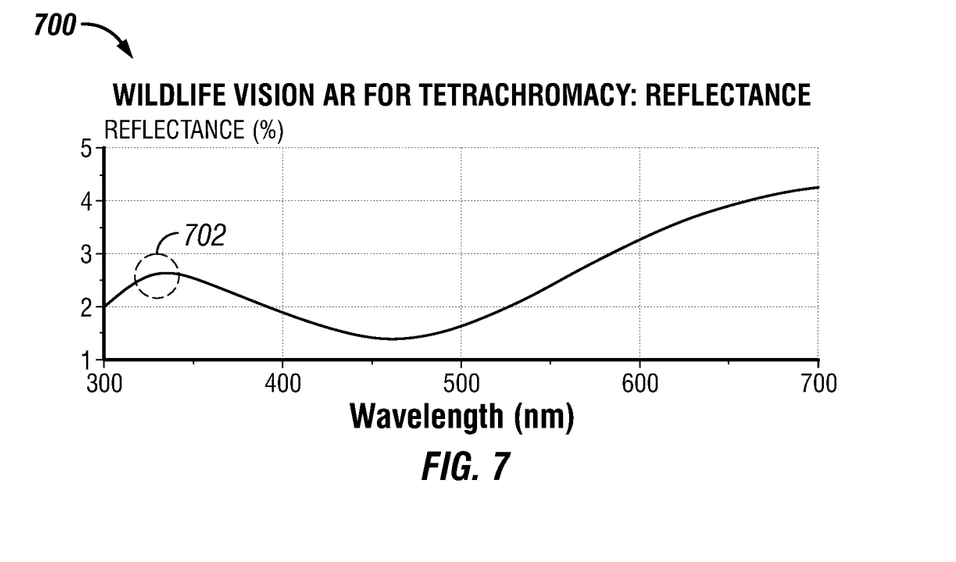
FIG. 7, a reflectance graph of an anti-reflective coating that reflects 4.2% at the 700 nm range and 2.6% at 240 nm range at 60° angle of incidence, in accordance with an embodiment of the present invention.

In yet another example of a reflectance graph 700 shown in FIG. 7, the anti-reflective coating works on the faces of the substrate to reflect 4.2% at the 700 nm range, and 2.6% at 240 nm range at 60° angle of incidence. Here, the anti-reflective coating exhibits a reflectance percentage 702 of 4.2% at the 700 nanometers range and 2.6% at 240 nanometer range at 60° angle of incidence. As discussed above, the anti-reflective composition can be adjusted to vary these reflectance points further.

Figure 8:
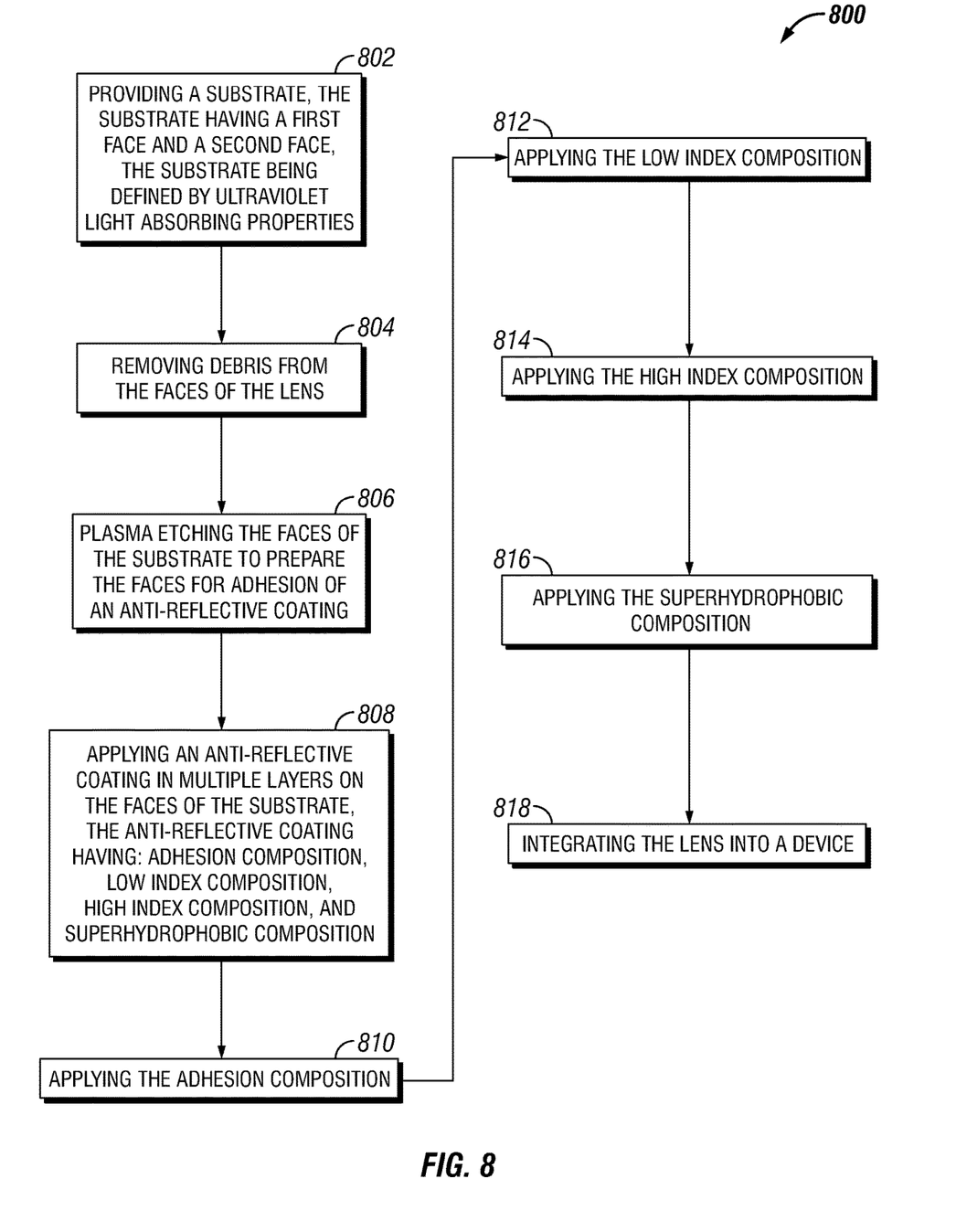
FIG. 8 shows a flowchart of an exemplary method for treating a viewing lens to reduce glare and reflections for birds with tetra-chromatic vision, in accordance with an embodiment of the present invention.

Turning now to the process of substrate treatment, FIG. 8 illustrates a flowchart of an exemplary method 800 for treating a viewing lens to reduce glare and reflections for birds with tetra-chromatic vision. In one possible embodiment, the method 800 has an initial Step 802 of providing a substrate, the substrate having a first face and a second face, the substrate being defined by ultraviolet light absorbing properties.

In some embodiments, the method 800 may further comprise a Step 804 of removing debris from the faces of the lens. This debris removal, or cleaning, may include ultrasonic cleaning methods known in the art. A Step 806 comprises plasma etching the surfaces of the substrate 102 to prepare the surfaces for adhesion of an anti-reflective coating 114. The etching helps further clean the first and second faces of the lens.

In some embodiments of the present invention, whether the substrate is hard-coated is determinative of additional steps. For example, if the substrate 102, or optical element/lens, is not hard-coated, the substrate 102 is carried through the hard-coating process, as described below. But if the substrate is hard-coated, the hard-coating steps described below are not performed. Further, if the substrate is hard-coated, but the manufacturer wishes to apply a better hard-coat to the substrate 102, the substrate passes through a strip and dip process. Thus, if the substrate 102 is not hard-coated, dipping the lens into a primer solution.

After the ultrasonic cleaning, the substrate 102 is dipped into a primer solution, to prep the substrate 102 for dip hard-coating. If the substrate 102 is not, however, hard-coated, spinning the primer solution onto the substrate 102. Finally, if the substrate 102 is not hard-coated, curing the lens in an oven. Following the hard-coating of the lenses, the hard-coat will need to be cured. The lens is transferred to a curing oven for curing, as known in the art.

A Step 808 includes applying an anti-reflective coating 114 in multiple layers on at least one face of the substrate, the anti-reflective coating 114 comprising an adhesion composition, a low index composition, a high index composition, and a superhydrophobic composition. In some embodiments, the anti-reflective coating 114 can be applied in a vacuum coating system, either through an electron beam gun evaporation technique or via a magnetron sputtering technique.

In some embodiments, the anti-reflective coating 114 that coats the faces of the substrate 102 include: an adhesion composition; a low index composition, a high index composition, and a superhydrophobic composition. In one embodiment, the low index composition is $SiO_2$. In other embodiments, a similar low index composition may also be used. In another embodiment, the high index composition is $ZrO_2$. In other embodiments, a similar high index composition may also be used. A step 810 includes applying the adhesive composition. A Step 812 includes applying the low index composition. A Step 814 includes applying the high index composition. A Step 816 includes applying the superhydrophobic composition.

In one non-limiting embodiment, the layering of coats of the face(s) is as follows: 1) applying the adhesion composition; 2) applying 164.53 nm of the low index composition on the faces of the substrate; 3) applying 14.16 nm of the high index composition on the faces of the substrate 102; 4) applying 23.5 nm of the low index composition on the faces of the substrate 102; 5) applying 101 nm of the high index composition on the faces of the substrate 102; 6) applying 76.19 nm of the low index composition on the faces of the substrate 102; and 7) applying a superhydrophobic composition on the faces of the substrate 102. The adhesion composition may include a glue, silicone, or other adhesive known in the art of lenses. The low index composition may include $SiO_2$. The high index composition may include $ZrO_2$.

Different variations of nanometer thickness, the low index composition and the high index composition may also be used however. And as described above, the application occurs in a vacuum coating system, either through electron beam gun evaporation techniques or via magnetron sputtering techniques. It is significant to note that if the anti-reflective coating is applied to one face, flipping the substrate 102 and coating the opposite face in the same manner.

A final Step 618 comprises integrating the substrate 102 into a viewing device 116; whereby the anti-reflection properties of the substrate 102 become inherent to the viewing device 116. The present invention can be produced on a wide range of viewing devices with unique optical elements, including gun sight lenses, ophthalmic lenses, camera lenses, and binocular/scope lenses. Because one objective for treating the substrate 102 in this manner is to minimize reflections for birds, the substrate 102 can be especially effective when operable in a gunsight or scope lens used with hunting rifles.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A viewing lens for incorporation into a viewing device to camouflage a user of the viewing device by rendering the viewing device substantially undetectable to birds with tetra-chromatic vision, the lens comprising:
   a substrate having a first face and a second face, the faces being defined by UV absorbing properties,
   the first face of the substrate comprising an anti-reflective coating, whereby the anti-reflective coating helps minimize reflection of light in the visible range of light from the point of view of a bird with tetra-chromatic eyesight between 400 to 700 nanometers and the ultra violet range of light between 300 to 400 nanometers, the anti-reflective coating comprising an adhesion composition on the first face of the substrate, a low index composition on the first adhesion composition, a high index composition on the low index composition, and a superhydrophobic composition on the low index composition, with the adhesion composition, the low index composition, the high index composition, and the superhydrophobic composition applied in sequential layers of varying nanometer thicknesses,
   the second face of the substrate comprising the anti-reflective coating, whereby the anti-reflective coating helps minimize reflection of light in the visible range of light between 400 to 700 nanometers and the ultraviolet range of light between 300 to 400 nanometers;
   the anti-reflective coating of the first face and of the second face of the substrate substantially uniformly antireflective throughout the first face and the second face, respectively; and
   the first face and the second face of the substrate rendered substantially undetectable to birds having tetrachromatic vision by reduction of glare and reflections from the point of view of the birds.

2. The lens of claim 1, wherein the substrate is defined by an internal absorption configured to absorb at least 97 percent of ultraviolet light.

3. The lens of claim 1, wherein the low index composition comprises $SiO_2$, and the high index composition comprises $ZrO_2$.

4. The lens of claim 3, wherein at least one of the faces of the substrate is coated with about 164.53 nm of the low index composition.

5. The lens of claim 4, wherein at least one of the faces of the substrate is coated with about 14.16 nm of the high index composition.

6. The lens of claim 5, wherein at least one of the faces of the substrate is coated with about 23.5 nm of the low index composition.

7. The lens of claim 6, wherein at least one of the faces of the substrate is coated with about 101 nm of the high index composition.

8. The lens of claim 7, wherein at least one of the faces of the substrate is coated with about 76.19 nm of the low index composition.

9. The lens of claim 1, wherein the reflection in the UV and visible light ranges from 0 to 60 degrees angle of incidence.

10. A method for treating a viewing lens to reduce glare and reflections for birds with tetra-chromatic vision and camouflage a user of the viewing device by rendering the viewing device substantially undetectable to the birds with tetra-chromatic vision, the method comprising:
    providing a substrate, the substrate having a first face and a second face, the substrate being defined by ultraviolet light absorbing properties;
    removing debris from the faces of the substrate;
    plasma etching the faces of the substrate;
    applying an anti-reflective coating in multiple layers on at least one face of the substrate, the anti-reflective coating comprising an adhesion composition, a low index composition, a high index composition, and a superhydrophobic composition, the compositions being sequentially applied in sequential layers of varying nanometer thicknesses as follows:
        applying the adhesion composition on the substrate;
        applying the low index composition on the adhesion composition;
        applying the high index composition on the low index composition;
        applying the superhydrophobic composition on the high index composition; and
    integrating the substrate into the viewing device, whereby the viewing device is rendered substantially undetectable to the birds having tetrachromatic vision by reduction of glare and reflections from the point of view of the birds.

11. The method of claim 10, wherein the step of applying the low index composition, further comprises applying 164.53 nanometers of the low index composition.

12. The method of claim 11, wherein the step of applying the high index composition, further comprises applying 14.16 nanometers of the high index composition.

13. The method of claim 12, wherein the step of applying the low index composition, further comprises applying 23.5 nanometers of the low index composition.

14. The method of claim 13, wherein the step of applying the high index composition, further comprises applying 101 nanometers of the high index composition.

15. The method of claim 14, wherein the step of applying the low index composition, further comprises applying 76.19 nanometers of the low index composition.

16. The method of claim 10, further comprising a step of dipping the substrate into a primer solution, if the substrate is not hard-coated.

17. The method of claim 10, further comprising a step of spinning the primer solution onto the substrate, if the substrate is not hard-coated.

18. The method of claim 10, further comprising a step of curing the substrate in an oven, if the substrate is not hard-coated.

19. A method for treating a viewing lens to reduce glare and reflections for birds with tetra-chromatic vision and camouflage a user of the viewing device by rendering the viewing device substantially undetectable to the birds with tetra-chromatic vision, the method comprising:
    providing a substrate, the substrate having a first face and a second face, the substrate being defined by ultraviolet light absorbing properties;
    removing debris from the faces of the substrate;
    etching the faces of the substrate with an etching device;
    if the substrate is not hard-coated, dipping the substrate into a primer solution;
    if the substrate is not hard-coated, spinning the primer solution onto the substrate;
    if the substrate is not hard-coated, curing the substrate in an oven;

plasma etching the faces of the substrate to prepare the faces for adhesion of an anti-reflective coating;

applying the anti-reflective coating in multiple layers on at least one face of the substrate, the anti-reflective coating comprising an adhesion composition on the substrate, a low index composition on the adhesion composition, a high index composition on the low index composition, and a superhydrophobic composition on the high index composition, the compositions being sequentially applied in layers of varying nanometer thicknesses as follows:

applying the adhesion composition on the substrate;

applying 164.53 nm of the low index material on the adhesion composition;

applying 14.16 nm of the high index material on the 164.53 nm of the low index material;

applying 23.5 nm of the low index material on the 14.6 nm of the high index material;

applying 101 nm of the high index material on the 23.5 nm of the low index material;

applying 76.19 nm of the low index material on the 101 nm of the high index material;

applying the superhydrophobic composition on the 76.19 nm of the low index material, whereby the varying nanometer thicknesses of the compositions render the faces of the substrate less apparent or undetectable to the birds with tetra-chromatic vision; and integrating the substrate into the viewing device, whereby the viewing device is rendered substantially undetectable to the birds having tetrachromatic vision by reduction of glare and reflections from the point of view of the birds.

* * * * *